(12) United States Patent
Yeh et al.

(10) Patent No.: US 6,282,636 B1
(45) Date of Patent: Aug. 28, 2001

(54) DECENTRALIZED EXCEPTION PROCESSING SYSTEM

(75) Inventors: Tse-Yu Yeh, Milpitas; Gregory Mathews, Santa Clara, both of CA (US); Steven Tu, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/221,197

(22) Filed: Dec. 23, 1998

(51) Int. Cl.⁷ .................................................. G06F 9/38
(52) U.S. Cl. .................................... 712/218; 712/244
(58) Field of Search .................................. 712/218, 244; 710/262, 264

(56) References Cited

U.S. PATENT DOCUMENTS

| | | | |
|---|---|---|---|
| 5,625,789 | * 4/1997 | Hesson et al. | 712/218 |
| 5,682,492 | * 10/1997 | MacFarland et al. | 712/218 |
| 5,748,936 | * 5/1998 | Karp et al. | 712/218 |
| 5,884,062 | * 3/1999 | Wichman et al. | 712/218 |
| 5,974,524 | * 10/1999 | Cheong et al. | 712/218 |
| 6,021,486 | * 2/2000 | Morrison | 712/218 |
| 6,049,868 | * 4/2000 | Panwar | 712/218 |
| 6,205,542 | * 3/2001 | Grochowski et al. | 712/219 |

* cited by examiner

Primary Examiner—William M. Treat
(74) Attorney, Agent, or Firm—Leo V. Novakoski (57) ABSTRACT

A decentralized exception processing system includes a plurality of local exception units. Each local exception unit is coupled to process local exception signals from one or more processing resources that are proximate to it. Each local exception unit generates local commit signals, using order information for the instruction in an issue group and any local exception signals it receives. The local commit signals are combined to generate a global commit signal for each instruction in the issue group. Local exception signals are collected at a selected one of the local exception units and processed to generate a global exception unit. The selected local exception unit resteers control of the processing resources to an exception handler associated with the global exception unit.

20 Claims, 5 Drawing Sheets

DECENTRALIZED EXCEPTION PROCESSING SYSTEM

BACKGROUND OF THE INVENTION

1. Field of the Invention

The present invention relates to the field of microprocessors, and in particular, to systems and methods for processing exceptions.

2. Background Art

A pipelined processor is organized as a series of cascaded stages of hardware. Instruction processing is divided into a sequence of operations, and each operation is performed by resources in a corresponding pipeline stage ("pipe stage"). Independent operations from several instructions may be processed simultaneously by different pipe stages, increasing the instruction throughput of the pipeline. By including multiple execution resources in each pipe stage, the pipelined processor can execute multiple instructions per clock cycle. Instructions that step through the processor pipeline in parallel form an issue group.

One final operation performed for each issue group is a check that determines which instructions of the issue group should update the architectural state with their results. An instruction that updates the architectural state is "committed" or "retired". An instruction may not be retired if it or an instruction that precedes it in the issue group triggers a condition or event that must be addressed by the processor outside of the scheduled flow of instructions. These conditions/events include architectural faults, architectural traps, micro-architectural faults, and micro-architectural traps, and are referred to collectively as "interruptions" or "exceptions". In the following discussion, "interruptions" and "exceptions" are used interchangeably.

When such an event/condition occurs, an "exception" is raised to signal the event to the processor. For example, an architectural exception is raised when an instruction tries to access an address that is not present in memory or the processor attempts to execute an undefined opcode. For these architectural exceptions, the processor intervenes and transfers control to a handler that addresses the triggering event. For micro-architectural exceptions, the processor may only need to flush the pipeline and reexecute the affected instructions.

Exceptions originate in the resources that are used to implement a given instruction. These resources may be referred to collectively as an execution port. For example, each instruction in an issue group is associated with a different execution port. The resources of an execution port typically include logic that is specific to the type of instructions it processes, such as branch units, floating point register files, load/store units. They also include shared resources that provide services to multiple execution ports, such as caches, translation buffers, and tables. Any of these resources may generate a warning signal (an "exception") if the instruction being processed triggers an exception.

More than one instruction in an issue group may trigger an exception, and a single instruction may generate more than one exception. Accordingly, exception signals must be collected from the different processor resources, prioritized, and analyzed to determine a highest priority exception for each issue group. The processor's response depends on the nature of the highest priority exception. When an exception occurs, the processor must determine which instruction(s) in the issue group, if any, can be retired. Retirement depends on the instruction's execution order relative to the instruction(s) of the issue group that generates the exception. The first instruction in execution order that raises an exception takes priority in the exception handling process. If this instruction raises multiple exceptions, the highest priority exception is addressed first.

Conventional processors employ a centralized exception/commit unit to process exception signals and generate commit signals to the execution ports. Centralized exception/commit units provide clean logic boundaries. However, given the relatively large number of execution resources in modern processors, the exception unit must receive and process a large number of exception signals. This can lead to signal routing problems, since all the exception signals must be provided to the centralized unit, and all the commit signals must be routed from the central unit to the various execution ports. In addition, the number of execution resources makes modern processors relatively large. This can create timing problems, especially for exceptions generated in the later pipe stages. In these cases, the exception signal must be routed to the central exception/commit unit, processed, and returned before the commit stage of the pipeline is reached.

The present invention addresses these and other problems related to exception/commit processing.

SUMMARY OF THE INVENTION

The present invention provides a distributed exception/commit system that allows exception signals to be processed by exception units that are local to the resources that generate them. The resulting local exception signals are combined to provide global exception/commit signals. The distributed nature of the system reduces routing congestion and timing constraints on the processed signals.

In accordance with the present invention, an exception/commit system includes multiple exception units. Each exception unit receives exception signals from resources that are local to it and generates one or more local commit signals. The local commit signals from the exception units are combined to provide a global commit signal for each execution port.

For one embodiment of the invention, local exception signals are prioritized, encoded, and forwarded to a selected exception unit. The selected exception unit determines a global exception from the encoded signals and resteers instruction processing based on the global exception.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail to focus attention on the features of the present invention.

The present invention provides a distributed exception/commit system that may be used advantageously in a superscalar processor to significantly reduce signal routing congestion and timing constraints relative to centralized exception/commit systems. The distributed exception/commit system includes multiple exception units, each of which receives an exception signal from one or more nearby processor resources. Each exception unit uses instruction-ordering information along with the one or more exception signals it receives to generate one or more local commit signals. Each local commit signal(s) is sent to a corresponding execution port(s). Each local commit signal indicates whether, based on the locally available exception signals, an instruction processed by the execution port should be retired. Local commit signals from each execution unit are combined to generate a global commit signal for each execution port.

For one embodiment of the invention, encoded exception information from each local exception unit is forwarded to a selected exception unit. The selected exception unit uses the encoded exception information to determine the highest priority exception raised. If necessary, the selected exception unit also updates interruption resources associated with the processor, and provides a resteer address to the front end of the processor pipeline. The resteer address directs the processor to an exception handling routine for the exception condition or to the address of the first instruction of issue group to be replayed.

In the following discussion, an "interruption" or "exception" refers to an event that an instruction triggers in one of the processor resources that services the execution port processing the instruction. When an instruction triggers an exception, instructions that follow the excepting instruction are not retired until the exception is addressed. For one embodiment of the invention, the excepting instruction itself is retired if the exception is a "trap". If the exception is a "fault", the excepting instruction may only be retired after the exception is addressed. Architectural exceptions are typically addressed through exception handlers - series of instructions to which control of the processor is passed when an exception is encountered. Micro-architectural exceptions may be handled by the processor hardware, i.e. without recourse to exception handlers or assist code. For the above-described embodiment, a faulting instruction is not committed before the exception handler or the exception-handling hardware is invoked. A trapping instruction is committed before the exception handler or hardware is invoked.

Exception processing provides a selective retirement and resteer mechanism for conditions/events that are addressed outside the flow of scheduled instructions in the processor. As noted above, these conditions/events may include architectural exceptions, micro-architectural exceptions, pseudo exceptions, aborts, and external interrupts.

Architectural exceptions typically arise when an instruction triggers an operation that is inconsistent with the architecture of the processor. Architectural exceptions may be faults, traps, or aborts and are reported to the operating system or application. Micro-architectural exceptions and pseudo exceptions are faults, traps, and aborts that are not reported to the operating system or application, but are handled through hardware or assist code. Faults affect the excepting instruction and all instructions that follow it in the same issue group. Traps affect only the instructions that follow the excepting instruction in the same issue group.

Micro-architectural faults and traps may result in replays of all or some of the instructions in an issue group. For example, one micro-architectural fault arises when a translation buffer look-up fails to hit a translation entry. For one embodiment of the invention, the faulting instruction and the instructions that follow it in the issue group are replayed until a hardware engine locates the needed translation and installs it in the translation buffer. For another embodiment, the processor pipeline is resteered to the first instruction in the issue group, and each instruction of the issue group is "replayed" until the fault condition is eliminated or an architectural exception is raised.

An exemplary micro-architectural trap arises when it is determined that data returned by an advanced load is stale, i.e. the load was moved above a store to an overlapping memory address. The load is reexecuted and the instructions that follow it (which may depend on the returned data) are replayed. The present invention may be used to process architectural exceptions, micro-architectural exceptions, pseudo-exceptions, and the like.

Figure 1:
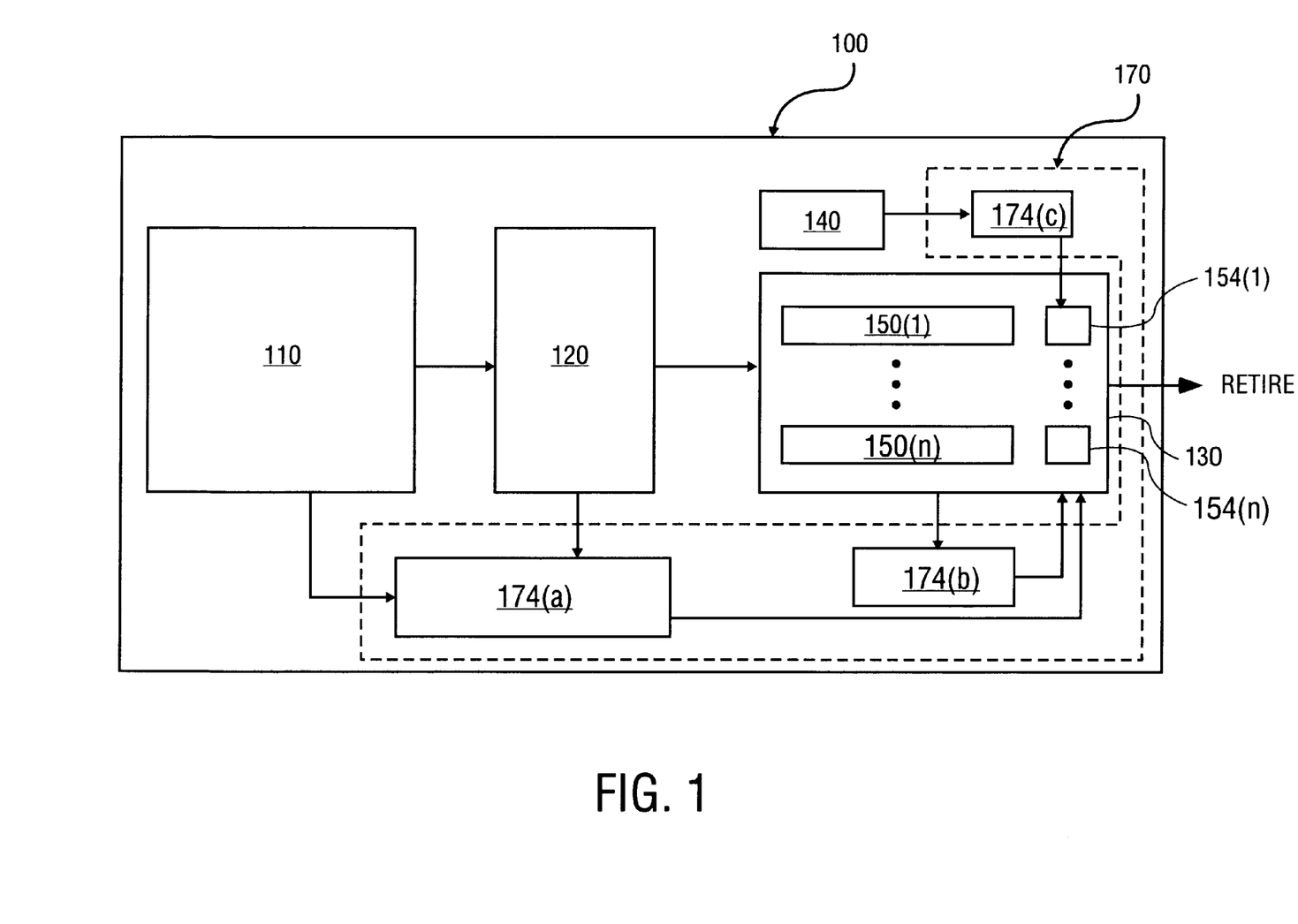
FIG. 1 is a block diagram of one embodiment of a processor that includes an exception/commit system in accordance with the present invention.

FIG. 1 is a block diagram of a processor 100 that includes an exceptioi/commit system 170 in accordance with the present invention. The disclosed embodiment of exception/commit system 170 includes exception units 174(*a*), 174(*b*), and 174(*c*) (collectively, exception units 174). An instruction fetch module 1 10, an instruction dispersal module 120, and an execution module 130 with associated cache 140 are also indicated in processor 100. Instruction fetch module 110 includes circuitry to provide instructions to the other resources of processor 100 for processing. Fetch module 1 10 typically includes branch prediction resources to anticipate control flow changes and an instruction cache to store instructions.

Instruction dispersal module 120 includes circuitry for routing instructions to appropriate resources in execution module 130 and assigning registers for use by the instructions during processing. Execution module 130 includes multiple execution units 150(1)–150(*n*) (collectively, "execution units 150") for processing different types of instructions. For example, different execution units 150 may process memory instructions, floating-point instructions, integer instructions, and branch instructions. Processor 100 employs fetch module 110, dispersal module 120, and one of execution units 150 to implement each instruction. The availability of multiple execution units 150 allows processor 100 to process multiple instructions concurrently. In a pipelined processor, these instructions are passed through the various pipe stages in step with each other. In the following discussion, instructions that are processed concurrently are referred to as an issue group.

The functional blocks (FUBs) indicated in FIG. 1 are provided to illustrate one embodiment of the present invention. Other embodiments of the invention may operate with processing resources that are distributed among these FUBs in different ways or reconstituted as different FUBs altogether. The present invention does not depend on a particular configuration of these resources to operate.

For the disclosed embodiment of exception/commit system 170, each exception unit 174 processes exception signals from the pipeline resources that are proximate to it ("local resources"). For example, exception unit 174(*a*) receives exception signals generated by resources in fetch module 110 and instruction dispersal module 120. Similarly, exception unit 174(*b*) receives exception signals generated by resources in execution module 130, and exception unit 174(*c*) receives exception signals generated by cache 140. For one embodiment, an additional exception unit (not shown) may be provided to process exceptions from some of the execution units in execution module 130.

Each exception unit 174 generates local commit signals for an issue group according to the exception signals it receives from its local resources and the relative ordering of the instructions in the issue group. Local commit signals from different exception units are combined to form a global commit signal for execution ports 154 of execution units 150. For the purpose of exception handling, each execution port 154 represents the processor resources used to implement an instruction that has reached the final stage of its corresponding execution unit 150. Each instruction in an issue group is retired from its execution port 154 or ignored, depending on the state of the global commit signal for its execution port 154.

As indicated in FIG. 1, exception signals are routed to different exception units 174, each of which is relatively close to the resources that generate the exception signals it processes. The distributed configuration of exception units 174 thus reduces routing congestion. In addition, the relative proximity of exception units 174 to their local resources reduces the timing constraints imposed on processing exceptions. For example, exceptions associated with cache 140 and execution units 150 may be raised relatively late in the pipeline of processor 100, e.g. within one or two clock cycles of execution ports 154. The exception signals must be processed relatively quickly to generate the appropriate commit signals and the commit signals must be propagated to the execution ports. Processing exception signals though local exception units 174 reduces the signal transit time. The local commit signals, e.g. commit signals based on locally available exception signals, may then be combined to provide the final (global) commit signal.

Commit signals depend on which instructions raise exceptions as they are processed by processor 100, the relative ordering of the instructions, and the types of exceptions raised. For example, when an instruction raises an architectural exception, all instructions in the issue group that precede the instruction in execution order retire normally. Instructions that follow the excepting instruction are not retired until the exception is addressed. The excepting instruction itself is retired normally if the exception is a trap, and its retirement is delayed if the exception is a fault. Thus, the relative ordering of the instructions determines which exception signals received by an exception unit 174 will effect the local commit signals. In addition, an instruction may raise more than one exception, but only one exception is processed at a time. Accordingly, when an instruction raises multiple exceptions, these are prioritized to determine which to process first.

Figure 2:
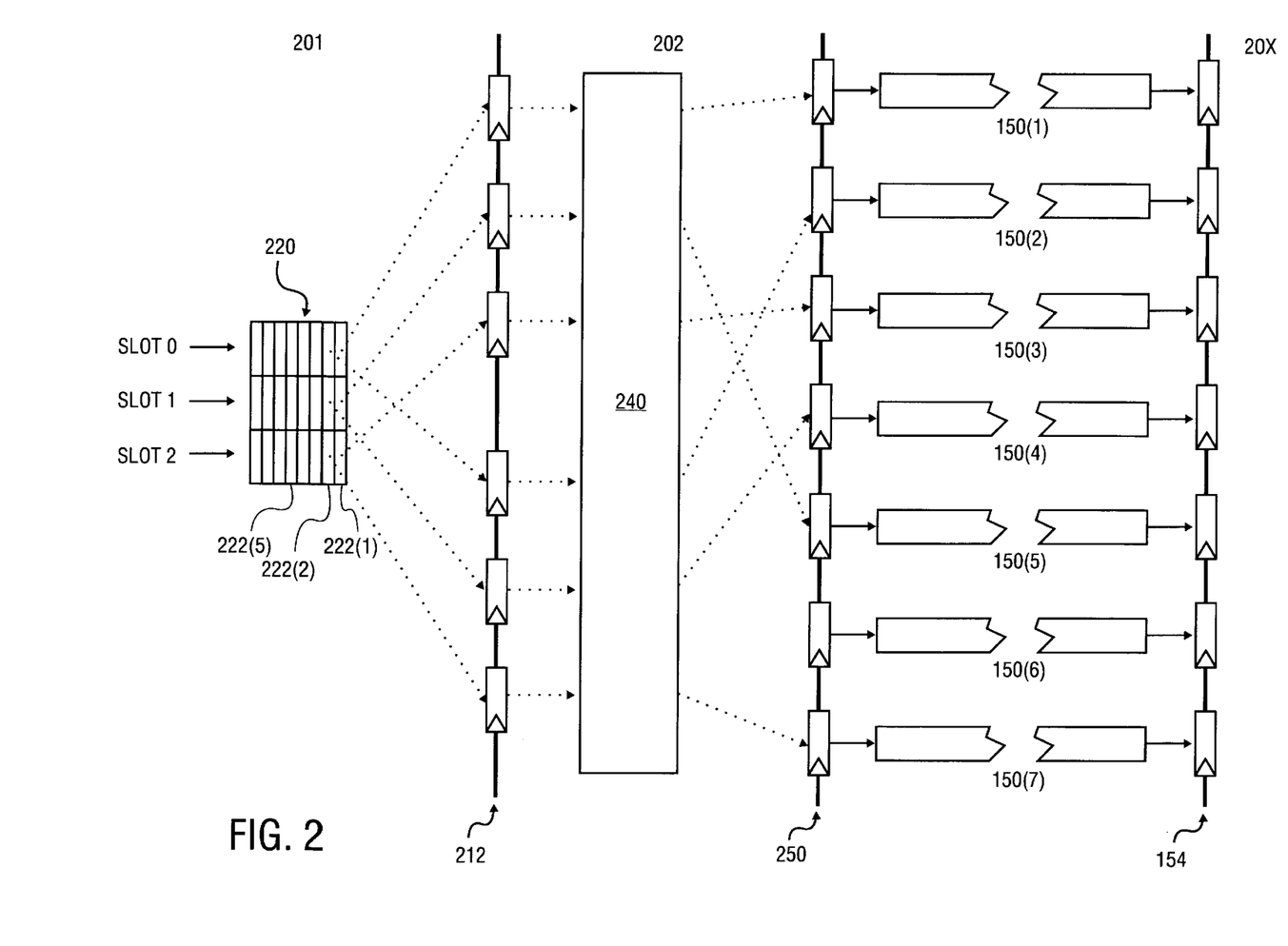
FIG. 2 illustrates one embodiment of the instruction dispersal system of FIG. 1.

FIG. 2 represents embodiments of instruction dispersal module 120 and execution units 150 that are suitable for use with the present invention. Also shown are pipe stages 201, 202, 203 . . . 20*x* to indicate the relative timing of operations associated with different resources of dispersal module 120 and execution units 150. For one embodiment, dispersal module 120 provides instruction-ordering information for exception units 174.

Dispersal module 120 includes an instruction buffer 220 and dispersal logic 240. Staging latches 212 couple instructions from buffer 220 to dispersal logic 240. For the disclosed embodiment, instruction buffer 220 has eight entries 222, each having three instruction slots (0–2). As indicated, up to six instructions from entries 222(1) and 222(2) may be provided to staging latches 212 on each clock cycle. Dispersal logic 240 routes the instructions to execution units 150 according to the type of the instruction. The dashed lines in stage 202 represent instruction routing for an exemplary issue group that is discussed in conjunction with FIG. 3. Staging latches or ports 250 control the timing of instruction transfer from dispersal logic 240 to execution units 150. Execution units 150 may operate over multiple pipe stages of pipeline 200, as indicated by their broken appearance.

Multiple execution units 150 allow multiple instructions to be processed concurrently. In the disclosed embodiment, up to six instructions may be processed concurrently (6 instruction issue group), if sufficient instruction level parallelism and the appropriate execution resources are available. For example, execution units 150(1), 150(2) may process memory instructions, execution units 150(3), 150(4) may process integer instructions, execution units 150(5), 150(6) may process floating-point instructions, and execution unit 150(7) may process branch instructions. For one embodiment, execution unit 150(7) includes three separate branch execution units so that up to three branch instructions can be processed in parallel.

As noted above, execution port 154 represents the point in pipeline 200 at which the results of an instruction in the associated execution unit 150 are committed or ignored. For one embodiment of the invention, each port, 154 receives a global commit signal (not shown) generated from the local commit signals of exception units 174. For one embodiment, results of the instruction are committed in stage 20*x* if the global commit signal is in a first logic state. They are ignored if the global exception signal is in a second logic state. The commit stage is designated by 20*x* to indicate that execution units 150 typically operate over more than one pipe stage.

Figure 3:
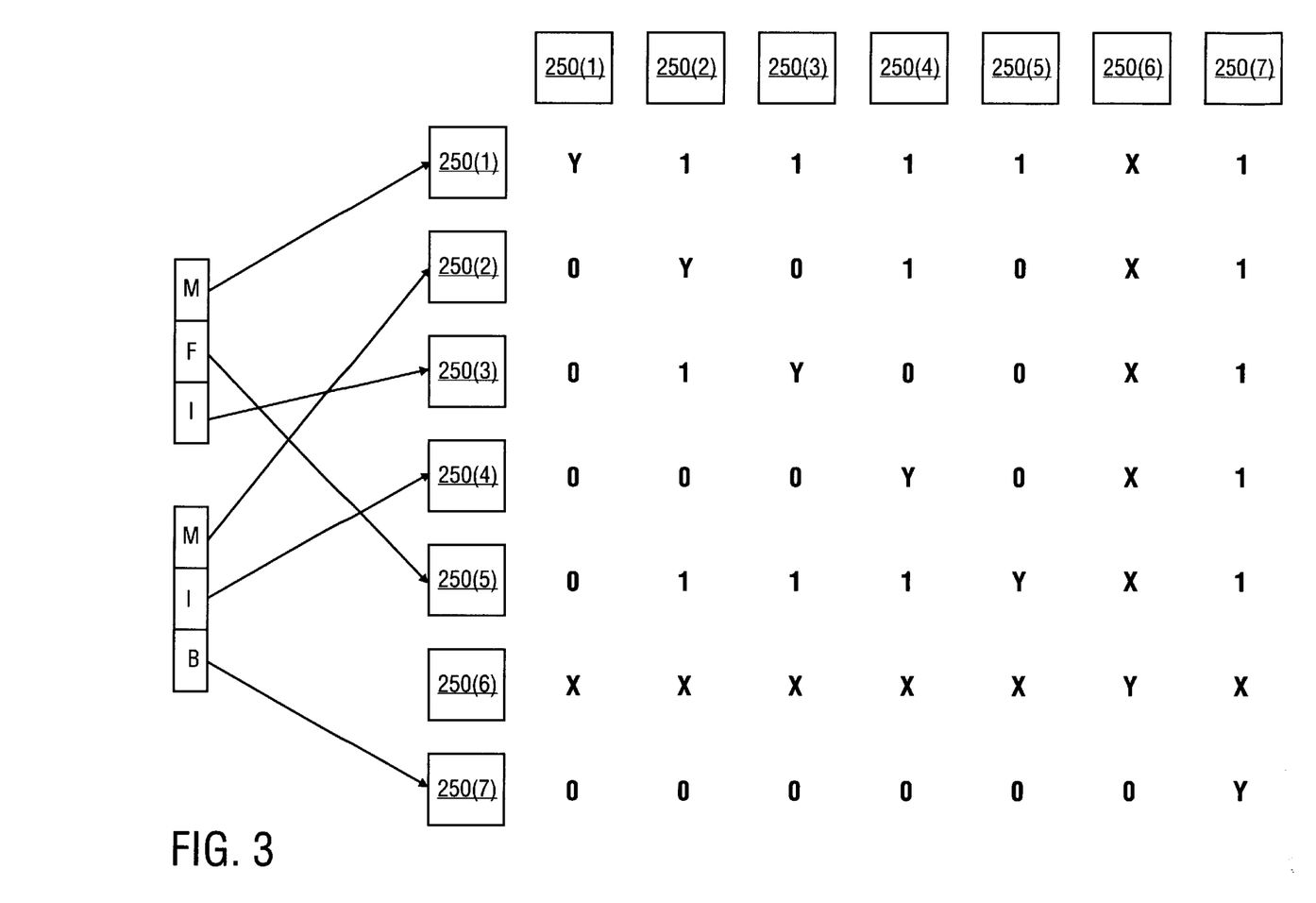
FIGS. 3 represents one method for generating local commit signals from local exception signals.

FIG. 3 represents an instruction order mask 300 that may be used by an exception unit 174 to determine which local commit signal(s) (if any) to assert. Ordering information is illustrated for the case in which instructions are issued to six ports 250, which forward the received instructions to associated execution units. In the exemplary embodiment, ports 250 (1) and 250(2) receive memory (M) instructions, ports 250(3) and 250(4) receive integer (I) instructions, ports 250(5), 250(6) receive floating point (F) instructions, and port 250(7) receives branch (B) instructions.

The operation of order mask 300 is illustrated for an issue group that includes of the following instructions:

| load (r1) → r2 | (M) |
|---|---|
| fmac f1, f2, f3 → f4 | (F) |
| move PFS → r4 | (I) |
| store (r5), r6 | (M) |
| add r1, r5 → r7 | (I) |
| branch <cyrano> | (B) |

The instructions are listed in execution order, beginning with the load instruction. The letter in parenthesis following the instruction represents the type of execution unit 150 that processes the instruction. For example, fmac is a floating point multiply-accumulate instruction that is processed by the floating point (F) execution unit, while the load and store instructions are memory operations implemented by the Memory execution unit. In the above example, dispersal logic 240 routes the load instruction to port 250(1), the fmac instruction to port 250(5), the move instruction to port 250(3), the store instruction to port 250(2), the add instruction to port 250(4), and the branch instruction to port 250(7). Since the exemplary issue group includes only one floating point instruction, port 250(6) for second floating point unit 150(6) is not used.

Order mask 300 represents order information for the instructions assigned to ports 250. Each row of the table is associated with the instruction (row instruction) indicated to the left. Each column of a row is associated with another instruction in the issue group. Each entry of order mask 300 corresponds to a row instruction/column instruction pair, and the value assigned to the entry represents the relative ordering of the row and column instructions. For the disclosed embodiment, a row, column entry is set to one when the column instruction follows the row instruction in execution order. The entry is set to zero when the column instruction precedes the row instruction in execution order.

The value assigned to a diagonal entry, where the row and column instructions are identical, depends on whether the instruction raises an exception and the type of exception it raises. If the instruction does not raise an exception, its diagonal value is immaterial. If the instruction does raise an exception, the diagonal value is one if the exception is a fault (the instruction is not retired) and zero if the exception is a trap (the instruction is retired). In FIG. 3, diagonal entries are indicated by "Y", which is set to 1 if the instruction faults or 0 if the instruction raises a trap or raises no exception. Entries associated with port 250(6) are labeled "X" to indicate "don't care", since there is no instruction assigned to this port in the example.

Order mask 300 provides order information to exception units 174. Since it is based on data from dispersal module 240, it is available relatively early in pipeline 200. There is sufficient time to transmit the order information to exception units 174 before the issue group is considered for retirement. Exception units 174 combine exception signals from their associated resources with the order information provided by order mask 300, to determine their local commit signals. The entire order mask need not be provided to every exception unit 174. For example, an exception unit need only receive the mask rows corresponding to instructions processed in the execution ports supported by the exception unit.

For one embodiment of the invention, local commit signals are generated for each execution port using the row data that corresponds to the first instruction (in execution order) that raises an exception. For example, if the store instruction in port 250(2) is the first instruction in execution order that raises an exception, the row data used is 0 1 0 1 0 X 1 for a fault and 0 0 0 1 0 X 1 for a trap. A local commit signal for each column instruction is provided by NANDing the exception signal with its corresponding entry in the row data.

For another embodiment of the invention, local commit signals are generated for each execution port by NANDing the exceptions with the row data that corresponds to each instruction that raises an exception and ANDing the results of each row together. For example, if both the store instruction in port 250(2) and the fmac instruction in port 250(5) raise exceptions, the row data from the store instruction is 01010X1 for a fault or 00010X1 for a trap, and the row data from the fmac instruction is 01111X1 for a fault or 01110X1 for a trap. The result of NANDing each row with its exception yields the following:

| | |
|---|---|
| Store (fault) → | 10101X0 |
| Store (trap) → | 11101X0 |
| FMAC (fault) → | 10000X0 |
| FMAC (trap) → | 10001X0 |

The local commit signals (by column) are:

| | |
|---|---|
| Store fault/FMAC fault → | 10101X0 |
| Store fault/FMAC trap → | 10001X0 |
| Store trap/FMAC fault → | 10000x0 |
| Store trap/FMAC trap → | 10001X0 |

For distributed exception/commit system 170, each exception unit 174 receives exception signals from only some of the resources. For example, the instruction in port 250(2) may trigger an exception in data cache 140, e.g. a reserved register/field fault exception. If that is the only exception raised by the issue group, the exception signal is received by local exception unit 170(c), and none of the exception signals received by exception units 174(a) and 174(b) is asserted. NANDing the received exception signals with the order mask asserts all local commit signals from exception units 174(a), 174 (b). Exception unit 174(c) receives the exception signal for port 250(2), identifies it as a fault, adjusts entry 2,2 of order mask 300 accordingly, and NANDs the asserted exception signal with the mask entries for row 2. Because the instruction in port 250(2) precedes those in ports 250(2) and 250(4), as indicated by order mask 300. exception unit 174(c) asserts local commit signals for ports 250(1), 250(3), 250(5) and deasserts local commit signals for ports 250(2), 250(4), and 250(7). The global commit signal for each port is obtained by ANDing the local commit signals for the port from exception units 174(a), 174(b), and 174(c).

The above procedure allows distributed execution/commit system 170 to identify the earliest instruction of the issue group that raises an exception. However, the appropriate exception handling procedure depends on the type of exception raised, and some instructions may raise multiple exceptions. Since only one exception is processed at a time, multiple exceptions are first prioritized so that the highest priority exception is processed.

For one embodiment of distributed exception/commit system 170, each exception unit 174 identifies the highest priority exception generated by the earliest instruction that raises an exception in its local resources. This information may be used to determine the appropriate handler routine for processing the exception. 1For example, the highest priority exception may have an associated instruction pointer (IP) indicating the first instruction in the handler routine. This IP is provided to fetch module 110, which resteers processor 100 accordingly.

In order to reduce the amount of logic in exception units 174, resources for determining the handler IP may be centralized in one exception unit 170, e.g. exception unit 174(a). In this case, each exception unit 174 encodes the earliest, highest priority exception raised by its local resources. Here, the "earliest, highest priority exception" is the highest priority exception raised by the earliest instruction in execution order to raise an exception through the local resources. For the disclosed embodiment, exception units 174(b), 174(c) forward their earliest, highest priority exceptions to exception unit 174(a). Exception unit 174(a) may then process the forwarded exceptions with its own earliest, highest priority exception to determine a global exception. The global exception is the earliest, highest priority exception raised by the first instruction of the issue group (in execution order) that raised an exception. The appropriate resteer address is determined by the identity of this global exception. The resteer address may be determined in parallel with processing of the commit signals.

Figure 4:
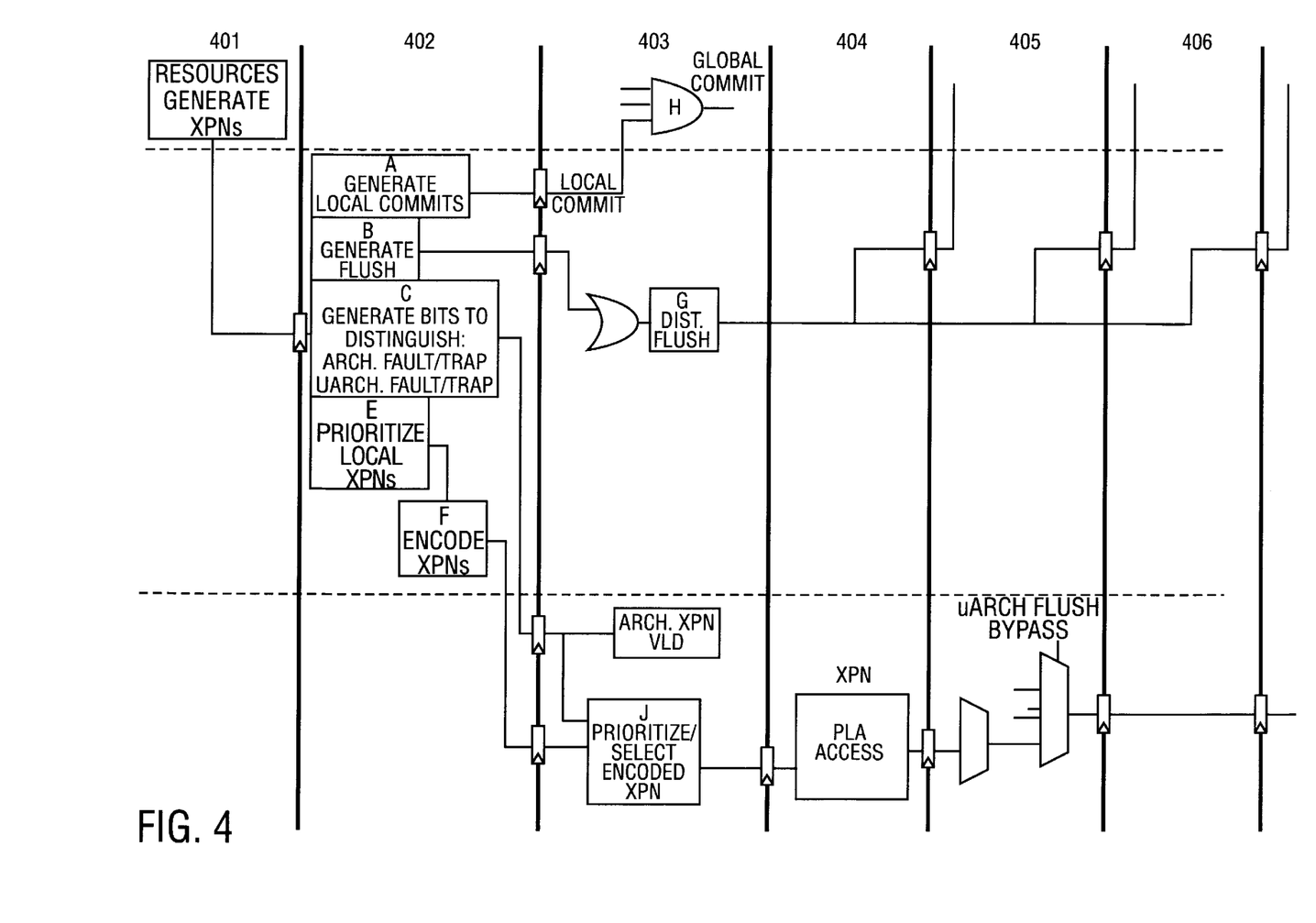
FIG. 4 illustrates the operation of various components of one embodiment of an exception/commit system in accordance with the present invention.

FIG. 4 is a block diagram of an exception processing pipeline 400. Pipeline 400 is divided into pipe stages 401–407 to indicate the times at which operations occur for exceptions generated in stage 401. The top row of pipeline 400 represents events at the resources monitored by the local exception units, and the middle row of pipeline 400 represents operations performed by each local exception unit.

For the disclosed embodiment, stage 401 corresponds to the stage of the pipeline in which the results of executed instructions are detected. Pipeline 400 is illustrated for exceptions generated in this stage, since they are subject to the most severe timing constraints. Pipeline 400 represents the operations for an embodiment of the distributed exception processing system in which one local exception unit collects exception signals from the other local exception units, determines a highest priority or global exception, and generates a resteer address appropriate for the global exception. Operations that are unique to this unit are represented in the bottom row of pipeline 400.

In the exemplary embodiment of pipeline 400, all exceptions are shown as generated by the various pipeline resources in stage 401. These are communicated to the local exception units in stage 402. Signal transmission within a single clock cycle is made possible by associating each resource with a nearby exception unit of exception/commit system 170. Blocks in the middle row of stage 402 represent the operations carried out by each exception unit on receipt of exception signals from its associated local resources.

On receipt of its local exception signals, each execution unit processes the signals to (A) generate a local commit signal for each port. For one embodiment, each exception unit may OR the local exception signals associated with a given execution port to determine whether an exception occurred at any resource that is servicing the instruction in the execution port. The exception signals from the various execution ports are mapped to instructions, and the first instruction in execution order that raised an exception is determined using the order mask. Local commit signals are generated by each exception unit, based on signals from its local resources, and forwarded to each execution port in stage 403. That is, block (A) represents the logic operations discussed in conjunction with FIG. 3. At each execution port, (H) the local commit signals are ANDed to provide a global commit signal. The global commit signal indicates whether the instruction processed by the port should be retired or ignored.

Each local exception unit that detects an exception (B) generates a flush signal that is distributed to resources of the processor. Tile flush signal(s) is used to clear the pipeline of all instructions which have not yet reached the retirement stage. For one embodiment, instructions following an excepting instruction are cleared while the pipeline is resteered to the exception handler or replay instruction(s). The cleared instructions are those in issue group(s) that follow the issue group of the excepting instruction, For another embodiment, all instruction which have not yet reached the retirement stage are cleared, including the excepting instruction and its issue group. For example, if a microarchitectural exception that causes a replay is detected early enough, the flush and replay can be generated before the excepting instruction reaches the retirement stage.

Different flush operations may be triggered, depending on the type of exception raised. For one embodiment, a "short" flush may be triggered by a microarchitectural exception, and a "long" flush may be triggered by an Architectural exception. In a long flush, the flush signal is asserted for four clock cycles, to allow the processor sufficient time to update its architectural state before the handler is invoked. In a short flush, the flush signal may be asserted for, e.g., two clock cycles, since no architectural update is required.

In the event that multiple exceptions are raised by a single instruction, these are prioritized (E) and encoded (F) in stage 402, and forwarded to the central exception unit in stage 402. In addition, signals characterizing the exception are generated and forwarded to the central exception unit. For example, (C) bits may be set to indicate if the exception is an architectural trap, an architectural fault, a microarchitectural trap, or a micro-architectural fault. These bits indicate the nature of the local, highest priority exception to the central exception unit.

Encoding the exception signals provided to the central exception unit, as indicated in FIG. 4, reduces the routing congestion in a system that employs distributed executioii/commit system 170. For example, an 8 bit signal bus can encode up to 256 different exception conditions/events. Each exception unit may store a table of prioritized exceptions and associated codes. When the earliest excepting instruction raises multiple exceptions, the table indicates which exception has the highest priority exception and provides a corresponding 8 bit code. In the disclosed embodiment, only two 8-bit buses are needed to communicate the highest priority local exception from exception units 174(b) and 174(c) to central exception unit 174(a). The alternative, fully centralized exception processing unit requires hundreds of signal lines.

For the disclosed embodiment, (J) signals from the local exception units are collected at the selected (coordinating) exception unit in stage 402. The selected exception unit uses the signals to identify the global exception and resteer the pipeline to the appropriate exception handler or replay address. The global exception may be identified, for example, by determining from the available order information which encoded exception corresponds to the earliest instruction in execution order of the issue group.

Figure 5:
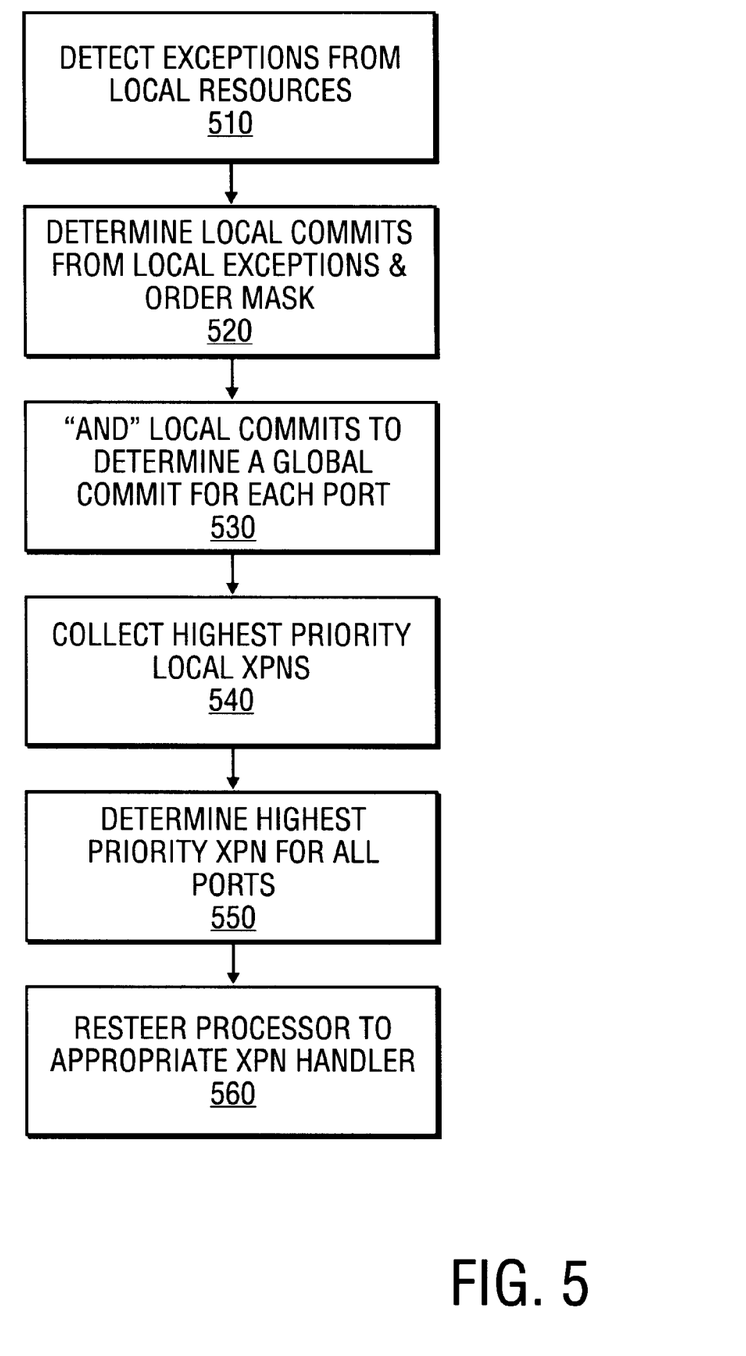
FIG. 5 is a flowchart representing a method for processing exception signals using the distributed exception/commit system in accordance with the present invention.

FIG. 5 is a flowchart representing a method 500 for processing exceptions in accordance with the present invention. Initially, each exception unit detects exceptions 510 from its local resources. To ease the timing constraints created by processing exceptions from resources distributed over ever larger chips, the local resources for an exception unit are selected from the resources that are proximate to the exception unit. Local commit signals are determined 520 from any local exception signals and instruction order information. For one embodiment, local commit signals are determined for each execution port in the system by combining the local exception signals with instruction order information provided in the form of an order mask. The exception units forward their local commit signals to each execution port, where they are "ANDed" 530 to determine a global commit signal for the execution port. For this embodiment, the instruction in an execution port is not committed if any local commit signal is asserted.

The highest priority local exceptions are collected 540 and the highest priority global exception is determined 550 from these. For example, each local exception unit may encode the highest priority exception detected from among its local resources and forward it to the central exception unit. The central exception unit may then determine which of the local highest priority exceptions is the global highest priority exception. For one embodiment, this may be accomplished by determining which excepting instruction is the first instruction in execution order in the current issue group. If the instruction raised more than one exception, either at the same or at different local exception units, the central exception unit may determine which of these exceptions has priority. This may be determined, for example, by the architecture of the processor. The processor is then resteered 560 to an exception handler corresponding to the highest priority global exception. In the event of a microarchitecture replay, the processor is resteered to the address of the first instruction to be replayed.

There has thus been provided a decentralized system for processing exceptions in a processor system. Multiple local exception units receive exception signals from local resources and generate local commit signals based on the local exception signals. The local commit signals are combined to generate a global commit signal for each execution port of the processor. Local exceptions are identified, prioritized, encoded, and forwarded to a central exception unit, which determines a global exception for the processor. A resteer address associated with the global exception indicates an address for a corresponding instruction handler or a replay address.

We claim:

1. A processor comprising:
   a plurality of execution ports, each execution port being associated with resources for processing an instruction;
   a plurality of exception units, each exception unit to receive an exception signal from one of the resources and generate a local commit signal for each of the execution ports according to the received exception signal; and
   a plurality of AND gates, each associated with one of the execution ports to combine the local commit signals into a global commit signal for the associated port.

2. The processor of claim 1, wherein each exception unit employs instruction order information to generate the commit signal.

3. The processor of claim 2, wherein the instruction order information is provided by an instruction dispersal unit.

4. The processor of claim 3, wherein the instruction order information is an order mask or a portion of an order mask for an issue group.

5. The processor of claim 1, wherein the plurality of exception units includes a central exception unit to process prioritized exception signals from the plurality of exception units.

6. The processor of claim 5, wherein the central exception unit determines an exception handler from encoded representations of the prioritized exception signals.

7. A method for selectively retiring instructions in an issue group, comprising:
   processing each instruction in an associated execution port;
   collecting local exception signals generated by the instructions at a plurality of exception units;
   generating local commit signals at each of the exception units, using the collected local exception signals and order information for the instructions; and
   combining the local commit signals to generate a global commit signal for each execution port.

8. The method of claim 7, further comprising determining a resteer address from the local exception signals.

9. The method of claim 8, wherein determining a resteer address comprises:
   prioritizing one or more local exception signals received by each exception unit; and
   forwarding an encoded representation of the prioritized exception signals to a selected one of the exception units.

10. The method of claim 8, wherein determining a resteer address comprises:
    collecting one or more local exception encodings at a selected exception unit;
    prioritizing the received local exception encodings to determine a global exception; and
    resteering instruction execution to an address associated with the global exception.

11. The method of claim 7, wherein generating local commit signals comprises:
    identifying a first excepting instruction from the local exception signals;
    adjusting row order data associated with the first excepting instruction according to whether a trap or a fault is indicated for the instruction; and
    assigning local commit signals to the execution ports according to a logical status of the row order data.

12. An exception processing system comprising:
    a plurality of execution ports, each execution port being associated with resources to concurrently execute instructions in an issue group; and
    a plurality of local exception units, each exception unit being coupled to receive exceptions signals from one or more of the resources and generate local commit signals for each of the execution ports.

13. The exception processing system of claim 12, wherein the local exception units are coupled to receive instruction order information for an issue group to generate the local commit signals.

14. The exception processing system of claim 12, wherein one of the local exception units is coupled to collect prioritized local exception signals from the local exception units and determine a prioritized global exception.

15. The exception processing system of claim 12, wherein a first of the local exception units is coupled to receive exception signals from an instruction fetch module, a second of the exception units is coupled to receive exception signals from a cache, and a third of the exception signals is coupled to received exception signals from execution units.

16. The exception processing system of claim 15, wherein the first local exception unit is coupled to receive prioritized local exception signal from the second and third local exception units and determine a global exception.

17. A system comprising:
    execution ports having associated resources to process an issue group of instructions concurrently; and
    means for processing exception signals at a plurality of locations that are proximate to the resources associated with the execution ports, generate local commit signals at the plurality of locations, and combine the local commit signals into a global commit signal for each of the execution ports.

18. The system of claim 17, further comprising means for dispersing the instructions of the issue group to resources associated with the execution ports, the dispersing means being coupled to provide instruction order information to the processing means.

19. The system of claim 17, wherein the processing means includes a plurality of local exception units.

20. The system of claim 19, wherein the local exception units includes one exception unit that is selected to process local prioritized exception signals from the local exception units.

* * * * *